United States Patent
Benkreira et al.

(10) Patent No.: US 11,037,115 B2
(45) Date of Patent: Jun. 15, 2021

(54) METHOD AND SYSTEM TO PREDICT ATM LOCATIONS FOR USERS

(71) Applicant: Capital One Services, LLC, McLean, VA (US)

(72) Inventors: Abdelkader M'hamed Benkreira, New York, NY (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/568,848

(22) Filed: Sep. 12, 2019

(65) Prior Publication Data

US 2021/0081913 A1 Mar. 18, 2021

(51) Int. Cl.
*G06Q 40/00* (2012.01)
*G06Q 20/10* (2012.01)
*G06N 5/02* (2006.01)

(52) U.S. Cl.
CPC .......... *G06Q 20/1085* (2013.01); *G06N 5/02* (2013.01)

(58) Field of Classification Search
CPC .............................. G06Q 20/1085; G06N 5/02
See application file for complete search history.

(56) References Cited

U.S. PATENT DOCUMENTS

| | | | |
|---|---|---|---|
| 8,348,151 B1 * | 1/2013 | Block | G07F 19/207 235/379 |
| 9,773,246 B2 * | 9/2017 | Faith | G06Q 30/0224 |
| 9,905,086 B1 * | 2/2018 | Phillips | G07F 19/206 |
| 10,395,199 B1 * | 8/2019 | Gibson | G06Q 20/18 |
| 10,825,307 B1 * | 11/2020 | Bhuvad | G06Q 20/1085 |

(Continued)

FOREIGN PATENT DOCUMENTS

| | | | | |
|---|---|---|---|---|
| IN | 4361/CHE/2011 | * | 6/2013 | |
| IN | 2016/41030200 | * | 3/2018 | G06Q 20/20 |
| KR | 2007/0111645 | * | 11/2007 | G07F 19/00 |

OTHER PUBLICATIONS

Rajib Chandra Das, et al. "Location based ATM locator system using OpenStreetMap," INSPEC Accession No. 15040805; Electronic (Year: 2014).*

(Continued)

*Primary Examiner* — Alexander G Kalinowski
*Assistant Examiner* — William B. Bunker
(74) *Attorney, Agent, or Firm* — DLA Piper LLP (US)

(57) ABSTRACT

A system and method for routing customers to an automated teller machine (ATM) is disclosed herein. A computing system receives, from a client device, a request to locate an ATM. The request includes a constraint of a desired ATM. The computing system identifies a plurality of ATMs proximate a location of the client device. The computing system pings the plurality of ATMs proximate the location of the client device to identify attributes associated with each respective ATM. The computing system receives the attributes from the plurality of ATMs proximate the location of the client device. The computing system compares the attributes from each respective ATM to historical ATM usage statistics associated with the client device. The computing system routes a user of the client device to a target ATM from the plurality of ATMs based at least partially on the historical ATM usage statistics.

17 Claims, 7 Drawing Sheets

(56) References Cited

U.S. PATENT DOCUMENTS

| | | | | |
|---|---|---|---|---|
| 2011/0184865 A1* | 7/2011 | Mon | ........................ | G07F 19/20 |
| | | | | 705/43 |
| 2012/0150779 A1* | 6/2012 | Vaiciulis | ................ | G06N 20/00 |
| | | | | 706/21 |
| 2012/0303448 A1* | 11/2012 | Psillas | .................... | G06Q 40/02 |
| | | | | 705/14.49 |
| 2013/0185148 A1* | 7/2013 | Townsend | .......... | G06Q 20/3223 |
| | | | | 705/14.49 |
| 2013/0191195 A1* | 7/2013 | Carlson | ............. | G06Q 30/0224 |
| | | | | 705/14.17 |
| 2014/0156537 A1* | 6/2014 | Vieira | ................ | G06Q 20/1085 |
| | | | | 705/304 |
| 2014/0279490 A1* | 9/2014 | Caiman | .................. | G06Q 20/40 |
| | | | | 705/43 |
| 2015/0198446 A1* | 7/2015 | Perez | ..................... | G01C 21/10 |
| | | | | 705/43 |
| 2016/0019640 A1* | 1/2016 | Barnett | ................ | G06Q 20/108 |
| | | | | 705/35 |
| 2016/0071133 A1* | 3/2016 | Gupta | ................ | G06Q 20/1085 |
| | | | | 705/7.33 |
| 2016/0078416 A1* | 3/2016 | DeLuca | ............. | G06Q 20/1085 |
| | | | | 705/43 |
| 2017/0140353 A1* | 5/2017 | Burdick | ................ | G07F 19/209 |
| 2018/0096322 A1* | 4/2018 | D'Agostino | ......... | G06Q 20/108 |
| 2018/0130035 A1* | 5/2018 | Dhulipalla | ............. | G06Q 20/10 |
| 2018/0190082 A1* | 7/2018 | Chebrole | ............... | G07F 19/209 |
| 2018/0341934 A1* | 11/2018 | Rodrigues | ............. | G07F 19/209 |
| 2019/0073663 A1* | 3/2019 | Jamkhedkar | ....... | G06Q 20/3223 |
| 2019/0180258 A1* | 6/2019 | Amar | ................... | G06F 3/0482 |
| 2020/0005279 A1* | 1/2020 | Raquepaw | ......... | G06Q 20/1085 |

OTHER PUBLICATIONS

Michael N. Huhns and Munindar P. Singh, "Personal Assistants," http://computer.org/internet/ IEEE Internet Computing. (Year: 1998).*

Cheong et al., "Ad-Hoc Automated Teller Machine Failure Forecast and Field Service Optimization," IEEE International Conference on Automation Science and Engineering (CASE). (Year: 2015).*

Embarak, "A two-steps prevention model of ATM frauds communications," The 5th HTC information Technology Trends (ITT 2018), Dubai, UAE (Year: 2018).*

* cited by examiner

METHOD AND SYSTEM TO PREDICT ATM LOCATIONS FOR USERS

FIELD OF THE DISCLOSURE

The present disclosure generally relates to a system and method for routing customers to an automated teller machine (ATM).

BACKGROUND

Currently, there are various means in which consumers may transact with third-party vendors. Credit card products are one instrument that are offered and provided to consumers by credit card issuers (e.g., banks and other financial institutions). With a credit card, an authorized consumer is capable of purchasing services and/or merchandise without an immediate, direct exchange of cash. Rather, the consumer incurs debt with each purchase. Debit cards are another type of instrument offered and provided by banks (or other financial institutions) that are associated with the consumer's bank account (e.g., checking account). Transactions made using a debit card are cleared directly from the cardholder's bank account. Still further, even in the digital age, consumers interact with automated teller machines (ATMs) to withdraw or deposit physical banknotes. As such, despite reliance on digital or non-cash transactions, there is still a need for individuals to locate ATMs during their regular course of business. Conventional approaches to identifying such ATMs may include searching for ATM locations via a bank's website or an Internet search. Such approaches have limitations in that they merely provide the location of ATMs, without providing additional details of the features corresponding therewith. Accordingly, conventional approaches are simply unable to route users to an ATM based on a particular user's ATM preferences or needs.

SUMMARY

Embodiments disclosed herein generally relate to a system and method for routing customers to an automated teller machine (ATM). In one embodiment, a method of routing customers to an ATM is disclosed herein. The computing system receives, from a client device, a request to locate an ATM. The request includes a constraint of a desired ATM. The computing system identifies a plurality of ATMs proximate a location of the client device. The computing system pings the plurality of ATMs proximate the location of the client device to identify attributes associated with each respective ATM. The computing system receives the attributes from the plurality of ATMs proximate the location of the client device. The computing system compares the attributes from each respective ATM to historical ATM usage statistics associated with the client device. The computing system routes a user of the client device to a target ATM from the plurality of ATMs based at least partially on the historical ATM usage statistics.

In some embodiments, receiving, from the client device, the request to locate the ATM includes the computing system receiving a text message from the client device. The computing system analyzes the text message to identify the request contained therein.

In some embodiments, the constraint of the desired ATM includes at least one or more of a maximum distance of the ATM from the location of the client device, a type of ATM, a fee-free ATM, an in-store ATM, and a no-limit ATM.

In some embodiments, the computing system receiving the attributes from the plurality of ATMs proximate the location of the client device includes the computing system receiving, from each ATM, a total amount of funds available in the ATM.

In some embodiments, the computing system identifying the plurality of ATMs proximate the location of the client device includes the computing system identifying a first set of ATMs associated with the computing system. The computing system identifies a second set of ATMs not associated with the computing system.

In some embodiments, the attributes associated with the ATMs include at least one or more of a fee associated with withdrawal, an increment in which funds are withdrawn, and a location of the ATM.

In some embodiments, the computing system routing the user of the client device to the target ATM from the plurality of ATMs based at least partially on the historical ATM usage statistics includes the computing system routing the user to the target ATM. The target ATM is scheduled to be refilled within a predefined period of the request.

In another embodiment, a method of routing customers to an automated teller machine (ATM) is disclosed herein. A computing system identifies that a user is likely to transact at an ATM. The computing system identifies a current location of the user based on a current location of a client device associated with the user. The computing system analyzes ATM transaction habits of the user to identify a common attribute across the plurality of ATMs with which the user transacted. The computing system identifies a plurality of candidate ATMs to which to route the user for an ATM transaction. The computing system prompts the user to visit a candidate ATM of the plurality of ATMs.

In some embodiments, the computing system identifying that the user is likely to transact at the ATM includes the computing system learning, via a prediction model, the frequency at which the user visits ATMs.

In some embodiments, the computing system identifying the plurality of candidate ATMs to which to route the user for the ATM transaction includes the computing system identifying a favorite ATM of the user. The favorite ATM of the user is the ATM at which the user most frequently transacts. The computing system identifies attributes of the favorite ATM of the user. The computing system determines that each of the plurality of candidate ATMs share at least one attribute of the attributes with the favorite ATM.

In some embodiments, the computing system identifying the plurality of candidate ATMs to which to route the user for the ATM transaction includes the computing system pinging each of the plurality of candidate ATMs to determine whether each of the plurality of candidate ATMs has sufficient funds for the ATM transaction.

In some embodiments, the computing system prompting the user to visit the candidate ATM of the plurality of candidate ATMs includes the computing system generating a text message comprising the plurality of ATMs. The computing system transmits the text message to the client device associated with the user.

In some embodiments, the computing system identifying the plurality of candidate ATMs to which to route the user for the ATM transaction includes the computing system identifying a first set of candidate ATMs associated with the computing system. The computing system identifies a second set of candidate ATMs not associated with the computing system.

In some embodiments, the attributes include at least one or more of a location of the ATM, a type of ATM, a maximum withdrawal amount, a fee-type associated with the ATM, and an increment in which funds are withdrawn.

In another embodiment, a system is disclosed herein. The system includes a processor and a memory. The memory has programming instructions stored thereon, which, when executed by the processor, perform one or more operations. The one or more operations include receiving, from a client device, a request to locate an ATM. The request includes a constraint of the desired ATM. The one or more operations include identifying a plurality of ATMs proximate a location of the client device. The one or more operations include pinging the plurality of ATMs proximate the location of the client device to identify attributes associated with each respective ATM. The one or more operations include receiving the attributes from the plurality of ATMs proximate the location of the client device. The one or more operations include comparing the attributes from each respective ATM to historical ATM usage statistics associated with the client device. The one or more operations include routing a user of the client device to a target ATM from the plurality of ATMs based at least partially on the historical ATM usage statistics.

In some embodiments, receiving, from the client device, the request to locate the ATM includes receiving a text message from the client device and analyzing the text message to identify the request contained therein.

In some embodiments, the constraint of the desired ATM includes at least one or more of a maximum distance of the ATM from the location of the client device, a type of ATM, a fee-free ATM, an in-store ATM, and a no-limit ATM.

In some embodiments, receiving the attributes from the plurality of ATMs proximate the location of the client device includes receiving, from each ATM, a total amount of funds available in the ATM.

In some embodiments, identifying the plurality of ATMs proximate the location of the client device includes identifying a first set of ATMs associated with the computing system and identifying a second set of ATMs not associated with the computing system.

In some embodiments, the attributes associated with the ATMs comprise at least one or more of a fee associated with withdrawal, an increment in which funds are withdrawn, and a location of the ATM.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein generally relate to a system and method of routing users to an ATM. For example, one or more techniques disclosed herein may attempt to route a user to an ATM based on historical transaction data associated with the user and one or more parameters associated with an ATM request. When users attempt to transact at an ATM, users typically are unaware of the parameters associated with an ATM. For example, a given ATM may be unable to receive cash deposits, unable to receive check deposits, may be unable to allow withdrawals in intervals desired by the user, and the like. Still further, in some situations, a given ATM may not be able to accommodate a user's withdrawal request due to inadequate funds in the ATM.

The one or more techniques disclosed herein attempt to address the above limitations of conventional ATMs by routing users to certain ATMs based on the user's transaction history and parameters associated with an ATM (e.g., usage statistics/modeling). For example, when the user requests an ATM location, the user may submit with the request one or more parameters of the desired ATM. The system may attempt to route the user to an ATM based on this request.

Further, in some embodiments, the system may predict when a user may next transact at an ATM. For example, based on the user's transaction history, one or more techniques disclosed herein may identify when the user may next use an ATM and anticipate such use by transmitting an ATM recommendation to the user.

Further, in some embodiments, the predictive model may predict user demand across the system of ATMs. For example, in addition to predictive individualized user demand, the predictive model may generate a prediction for demand across several ATMs and route users accordingly. Such predictive modeling may be beneficial in managing the funds distributed from each of the several ATMs. In other words, if a certain ATM is identified as a "hot" or more transacted at ATM, the predictive modeling may anticipate that ATM running out of funds before other ATMs. Rather than route a user to that particular ATM, the predictive model may divert users from that ATM and instead route the user to a more funded ATM.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
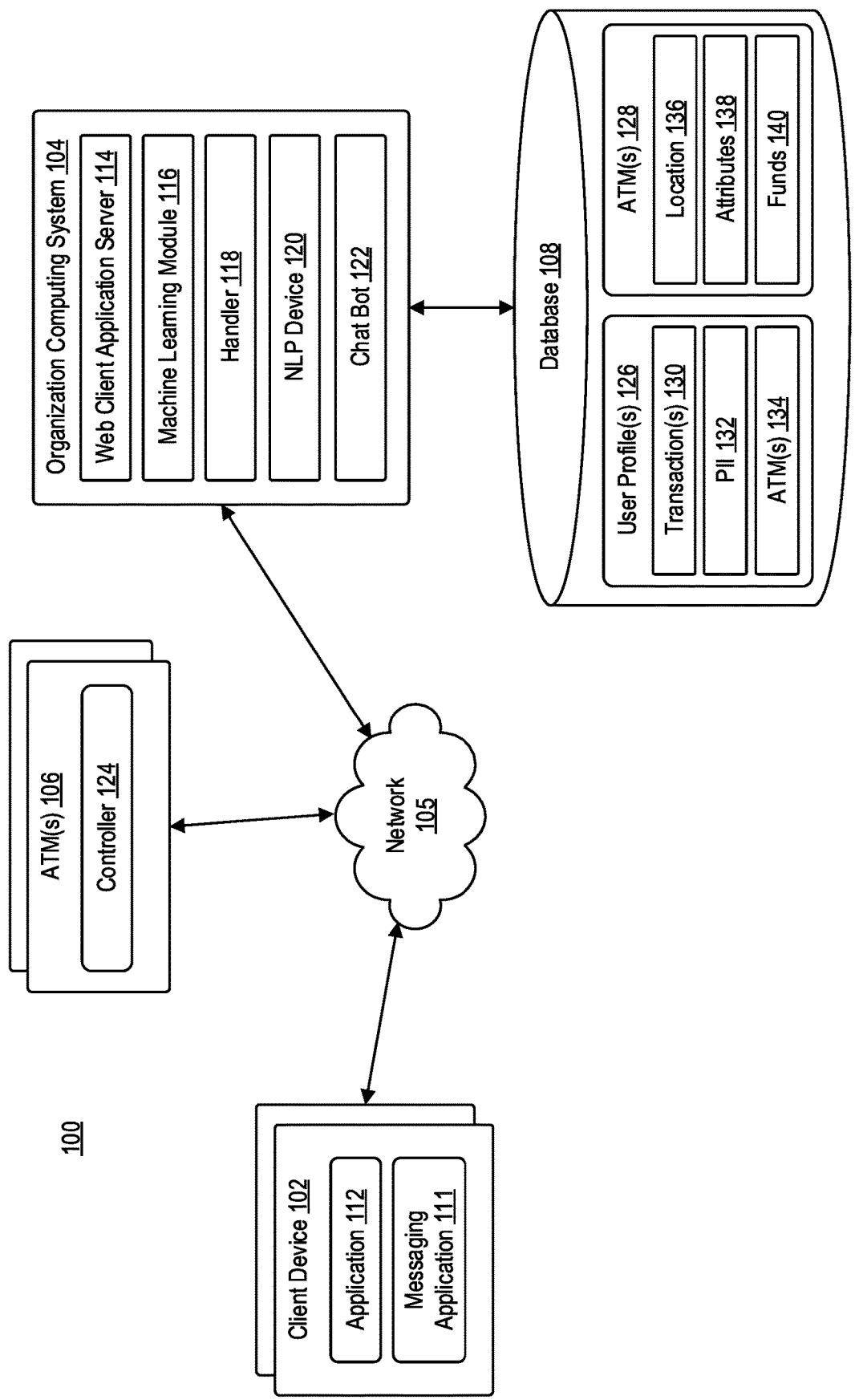
FIG. 1 is a block diagram illustrating a computing environment, according to example embodiments.

FIG. 1 is a block diagram illustrating a computing environment 100, according to one embodiment. Computing environment 100 may include at least a client device 102, ATMs 106, an organization computing system 104, and a database 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of system 100.

Client device 102 may be operated by a user. For example, client device 102 may be a mobile device, a tablet, a desktop computer, or any computing system having the capabilities described herein. Client device 102 may belong to or be provided to a user or may be borrowed, rented, or shared. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 112 and messaging application 111. Application 112 may be representative of a web browser that allows access to a website or a stand-alone application. Client device 102 may access application 112 to access the functionality of organization computing system 104. Client device 102 may communicate over network 105 to request a webpage, for example, from web client application server 114 of organization computing system 104. For example, client device 102 may be configured to execute application 112 to access content managed by web client application server 114. The content that is displayed to client device 102 may be transmitted from web client application server 114 to client device 102, and subsequently processed by application 112 for display through a graphical user interface (GUI) of client device 102. In some embodiments, a user of client device 102 may access application 112 to identify the location of an ATM.

Messaging application 111 may be representative of an application that allows users to transmit electronic messages to one or more computing systems (e.g., client devices). In some embodiments, client device 102 may be configured to execute messaging application 111 to access an email account managed by a third party web server. In some embodiments, client device 102 may be configured to execute messaging application 111 to transmit one or more text messages (e.g., SMS messages, iMessages, etc.) to one or more remote computing devices.

Organization computing system 104 may include at least web client application server 114, machine learning module 116, handler 118, natural language processor (NLP) device 120, and chat bot 122. Each of machine learning module 116, handler 118, NLP device 120, and chat bot 122 may include one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

In some embodiments, machine learning module 116 may be configured to learn user ATM habits. For example, machine learning module 116 may be configured to learn how often a user transacts at an ATM, the ATMs at which the user transacts, the types of ATMs with which the user interacts, user transaction habits at ATMs, and the like. Machine learning module 116 may include one or more instructions to train a prediction model. To train the prediction model, machine learning module 116 may receive, as input, ATM transaction data. Such ATM transaction data may include at least one or more of a plurality of ATM transactions, the users associated with each transaction, anonymized data, one or more attributes of the ATM involved in each transaction, and the like. Machine learning module 116 may implement one or more machine learning algorithms to train the prediction model to identify an ATM to which organization computing system 104 may route the user. For example, machine learning module 116 may train a prediction model to identify one or more ATM habits of an individual and one or more attributes of each ATM visited by the user to identify user preferences on ATM use. In some embodiments, the prediction model may generate a plurality of ATM options, allowing the user to choose the ATM at which the user wishes to transact. Still further, in some embodiments, prediction model may generate a prediction of when the user will next transact at an ATM and generate a proposal for the user in anticipation of this next transaction.

Machine learning module 116 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule-based machine learning model, and the like to train the prediction model.

Chat bot 122 may be configured to communicate with client device 102. For example, chat bot 122 may be configured to receive one or more messages from client device 102. In some embodiments, chat bot 122 may be configured to establish a persistent chat session between client device 102 and organization computing system 104. Additionally, chat bot 122 may engage in dialogue with a user of client device 102, such that chat bot 122 may respond to any follow-up questions the user may have. For example, chat bot 122 may provide the user with one or more ATM recommendations, based on an output generated by the prediction model.

NLP device 120 may be configured to receive and process incoming dialogue messages from client device 102. For example, NLP device 120 may be configured to receive a request from client device 102 for locating a nearby ATM based on user preferences. NLP device 120 may be configured to receive and execute a command that includes the request, where the command instructs NLP device 120 to work in conjunction with machine learning module 116 to route the user to a particular ATM. NLP device 120 may be configured to continuously monitor or intermittently listen for and receive commands to determine if there are any new commands or requests directed to NLP device 120. Upon receiving and processing an incoming dialogue message, NLP device 120 may output the meaning of the request, for example, in a format that other components of organization computing system 104 can process. In some embodiments, the received dialogue message may be the result of client device 102 transmitting a text message to organization computing system 104. In some embodiments, the received dialogue message may be the result of client device 102 transmitting an electronic message to organization computing system 104. In some embodiments, client device 102 may transmit a request via application 112 executing thereon.

In some embodiments, handler 118 may be configured to manage an account associated with each user. For example, account handler 118 may be configured to communicate with database 108. As illustrated, database 108 may include one or more user profiles 126 and one or more ATMs 128. Each user profile 126 may correspond to a user with an account with organization computing system 104. Each user profile 126 may include one or more transactions 130, personal identification information 132, and one or more ATM interactions 134.

Each of one or more transactions 130 may correspond to the transaction associated with an account of the user. Such transactions may include, but are not limited to, checking account transactions, savings account transactions, credit card transactions, ATM card transactions, transfer transactions, and the like. Personal identification information 132 may correspond to one or more items of information associated with the user. Such personal identification information 132 may include but is not limited to, user name, password, date of birth, social security number, address, full legal name, telephone number, billing zip code, salary information, and the like. ATM interactions 134 may correspond to a history of ATMs visited by the user. For example, for each ATM transaction in transactions 130, handler 118 may log a unique identifier associated with said ATM. In some embodiments, handler 118 may further log one or more features that the user leveraged during the ATM transaction (e.g., withdrawal amount, withdrawal denominations, deposited cash, deposited checks, checked balance, requested a receipt, and the like). Handler 118 may be configured to identify or log these features for all ATM transaction. In other words, handler 118 may be configured to log these features for ATMs associated with organization computing system 104 and ATMs not associated with organization computing system 104. Accordingly, database 108 may include a full ATM history of the user.

Each ATM 128 may be representative of an ATM associated with organization computing device. Each ATM 128 may include location 136, attributes 138, and funds 140. Location 136 may correspond to the physical location of the respective ATM 128. Location 136 may be representative of an address associated with ATM 128, location coordinates associated with ATM 128, a type of location in which ATM 128 is located (e.g., bank, grocery store, liquor store, mall, etc.), and the like.

Attributes 138 may correspond to one or more capabilities or traits associated with each ATM 128. Such attributes 138 may include but are not limited to, stamp purchases, no fee transactions, choose-your-own cash denomination, hearing-impaired capabilities, vision-impaired capabilities, and the like.

Funds 140 may correspond to an amount of funds currently available in each ATM 106. For example, handler 118 may ping a controller 124 of each ATM 106 to receive an updated amount of funds associated with each ATM. In some embodiments, handler 118 may maintain a running total of funds associated with each ATM 106, which may be updated after each transaction at the respective ATM 106. By identifying the amount of funds 140 available in each ATM 106, the prediction model may be able to account for those ATMs that do not have sufficient funds or do not have certain denominations the user typically requests. In some embodiments, handler 118 may maintain a running total of funds associated with third-party ATM 106 via one or more application programming interfaces (APIs) that link organizations associated third-party ATMs to organization computing system 104. In some embodiments, handler 118 may maintain a running total of funds associated with third-party ATMs by inferring said information based on ATM interactions 134 in database 108. In some embodiments, handler 118 may maintain a running total of funds associated with third-party ATMs 106 via one or more APIs that connect organization computing system 104 with a third party service that maintains said information.

Figure 2:
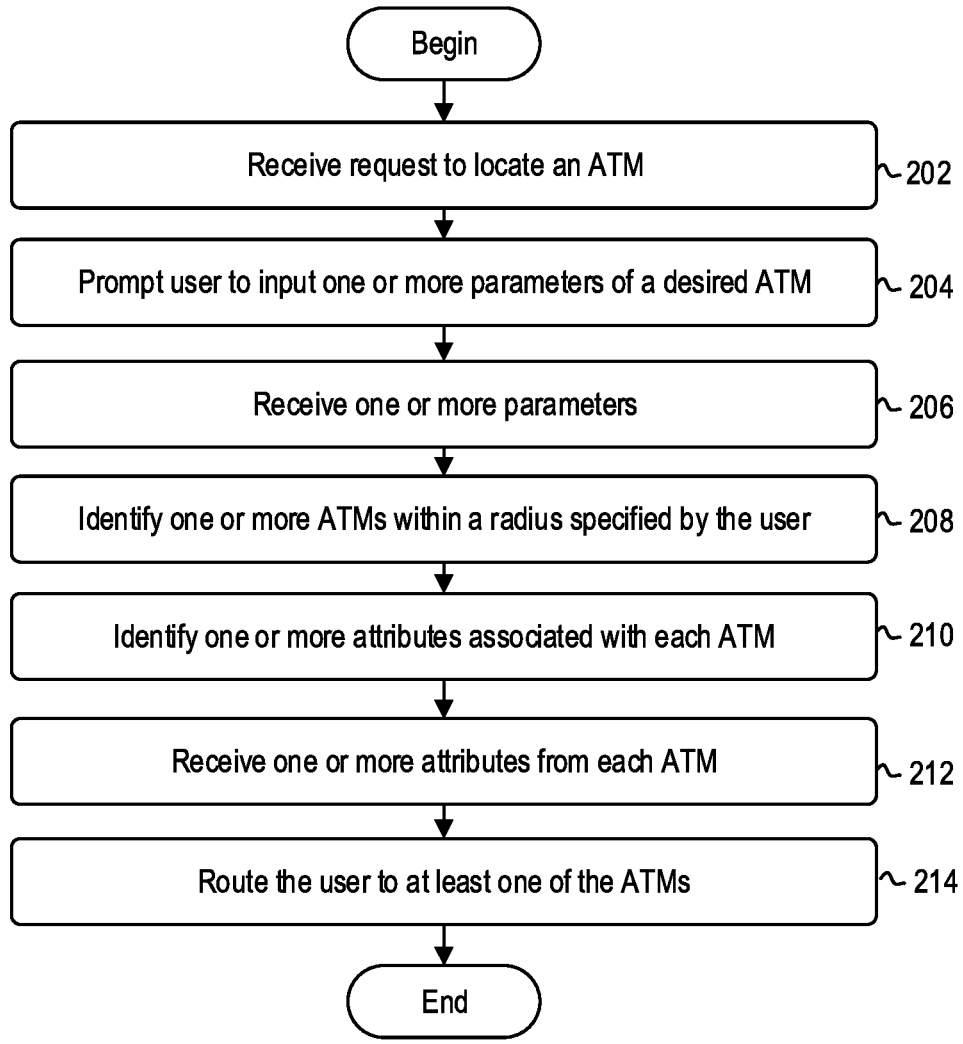
FIG. 2 is a flow diagram illustrating a method of routing customers to an automated teller machine (ATM), according to example embodiments.

FIG. 2 is a flow diagram illustrating a method 200 of routing customers to an automated teller machine (ATM), according to example embodiments. Method 200 may begin at step 202.

At step 202, organization computing system 104 may receive a request to locate an ATM. In some embodiments, organization computing system 104 may receive a request to locate an ATM via application 112 executing on client device 102. For example, a user may navigate to application 112 executing on client device 102 to locate one or more nearby ATMs. In some embodiments, organization computing system 104 may receive a request to locate an ATM via messaging application 111 executing on client device 102. For example, a user may transmit a text message to chat bot 122, requesting a nearby ATM. Upon receiving the text message, NLP device 120 may parse the text message to understand the request contained therein.

At step 204, organization computing system 104 may prompt a user to input one or more parameters of a desired ATM. In some embodiments, organization computing system 104 may prompt the user to provide one or more parameters via application 112 executing on client device 102. For example, organization computing system 104 may request that the user constrain his or her ATM search based on various constraints. In some embodiments, organization computing system 104 may prompt the user to constrain his or her ATM search by transmitting one or more text messages to client device 102. For example, chat bot 122 may generate a series of questions for transmission to client device 102, prompting the user with various questions directed to a type of ATM. Such questions may include, but are not limited to, "No fee only ATMs?," "Deposit-capable ATMs?," and the like. In some embodiments, organization computing system 104 may pre-populate search constraints for the user based on previous interactions with machine learning model 116 and transmit such constraints to client device 102 for review and/or editing.

At step 206, organization computing system 104 may receive one or more parameters from client device 102. For example, organization computing system 104 may receive one or more parameters from client device 102 via application 112 or messaging application 111.

At step 208, organization computing system 104 may identify one or more ATMs within a radius specified by the user. For example, handler 118 may be configured to query database 108 with the one or more parameters received from client device 102 to identify one or more ATMs that satisfy the user's request. In some embodiments, handler 118 may query database 108 and not receive any results. In such case, handler 118 may broaden the query by selectively removing parameters from the one or more parameters.

At step 210, organization computing system 104 may query database 108 to identify one or more attributes associated therewith. In some embodiments, organization computing system 104 may ping one or more ATMs 106 associated with organization computing system 104 to verify the status. For third-party ATMs, database 108 may maintain one or more attributes associated therewith based on customer historical interactions. For example, if anyone withdrew $50 from a third-party ATM, database 108 may reflect such transactions. This may mean that said third-party ATM allows for withdrawal denominations under $20.

At step 214, organization computing system 104 may route the user to at least one of the one or more ATMs. For example, based on the one or more attributes received from the one or more ATMs, organization computing system 104 may provide the user with an ATM recommendation. In some embodiments, the ATM recommendation may include two or more ATMs that satisfy a criteria specified by the user. In some embodiments, the ATM recommendation may include a single ATM recommendation. In some embodiments, the ATM recommendation may include an ATM that does not satisfy the user's criteria (i.e., no ATMs satisfying that criteria were found). Organization computing system 104 may transmit the recommendation to client device 102. In some embodiments, organization computing system 104 may notify the user via application 112 executing on client device 102. In some embodiments, organization computing system 104 may notify the user via an electronic message (e.g., text message). In some embodiments, the recommendation may include a link to open a map program having directions to the ATM. In some embodiments, the recommendation may include an address of the ATM. Further, in some embodiments, organization computing system 104 may transmit a text message to the user with the recommendation. In some embodiments, organization computing system 104 may send a notification to client device 102 via application 112 executing thereon.

Figure 3:
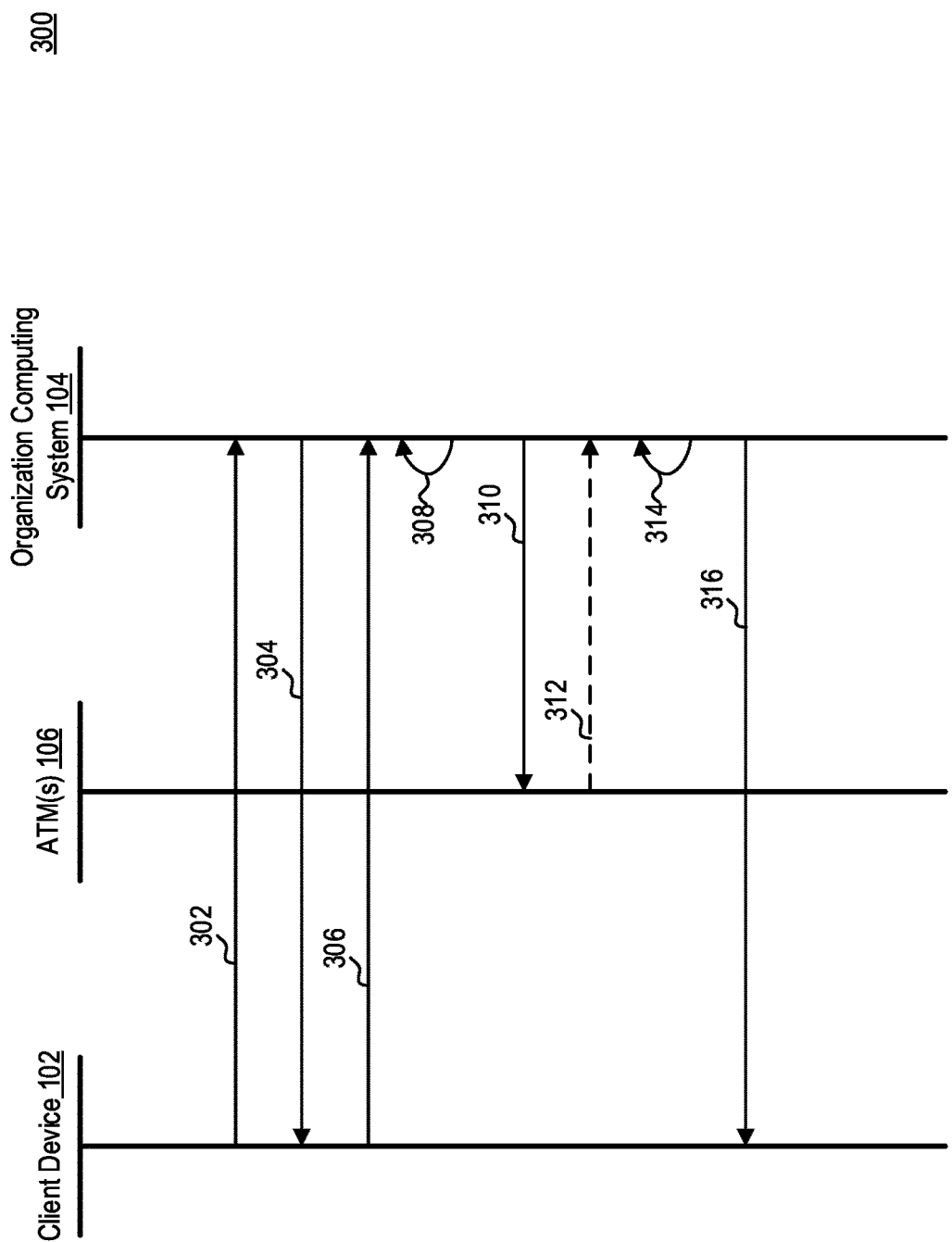
FIG. 3 is a block diagram illustrating a method of routing customers to an ATM, according to example embodiments.

FIG. 3 is a block diagram illustrating operations associated with routing a user to an ATM, according to example embodiments. At operation 302, client device 102 may transmit an ATM request to organization computing system 104. In some embodiments, the ATM request may be transmitted via application 112 executing on client device 102. For example, a user may navigate to an ATM finder feature, that allows a user to query organization computing system 104 for an ATM. In some embodiments, the ATM request may be transmitted to organization computing system 104 via an electronic message. For example, a user of client device 102 may use messaging application 111 to transmit a text message to organization computing system.

At operation 304, organization computing system 104 may receive the request from client device 102. In some embodiments, organization computing system 104 may receive a request to locate an ATM via application 112 executing on client device 102. In some embodiments, organization computing system 104 may receive a request to locate an ATM via messaging application 111 executing on client device 102. For example, a user may transmit a text message to chat bot 122, requesting a nearby ATM. Upon receiving the text message, NLP device 120 may parse the text message to understand the request contained therein. Organization computing system 104 may prompt a user to input one or more parameters of a desired ATM. Such parameters may include an amount to be withdrawn, a desired denomination, an ATM that sells stamps, a hearing-impaired ATM, and the like. In some embodiments, organization computing system 104 may prompt the user to provide one or more parameters via application 112 executing on client device 102. For example, organization computing system 104 may request that the user constrain his or her ATM search based on various constraints. In some embodiments, organization computing system 104 may prompt the user to provide one or more parameters for his or her ATM search by transmitting one or more text messages to client device 102.

At operation 306, client device 102 may transmit the requested one or more parameters of a desired ATM. In some embodiments, client device 102 may provide the one or more parameters via application 112. For example, a user may select or submit a set of constraints via application 112. In some embodiments, client device 102 may provide the one or more parameters to organization computing system 104 via messaging application 111.

At operation 308, organization computing system 104 may receive the set of constraints from client device 102. Organization computing system 104 may identify one or more ATMs within a radius specified by the user. For example, handler 118 may be configured to query database 108 with the one or more parameters received from client device 102 to identify one or more ATMs that satisfy the user's request.

At step 310, organization computing system 104 may query database 108 to identify one or more attributes associated therewith. In some embodiments, organization computing system 104 may ping (or communication with) one or more ATMs 106 associated with organization computing system 104 to verify the status. For example, organization computing system 104 may use machine learning model 116 to learn a user's ATM habits, and ping (or communicate with) ATM 106 to determine if it can support the identified ATM habits. For third-party ATMs, database 108 may maintain one or more attributes associated therewith based on customer historical interactions. For example, if anyone withdrew $50 from a third-party ATM, database 108 may reflect such transactions. This may mean that said third-party ATM allows for withdrawal denominations under $20. In some embodiments, block diagram 300 may include operation 312. At operation 312, each ATM 106 may receive the request from organization computing system 104. Each ATM 106 may process the request and transmit the requested information back to organization computing system 104.

At operation 314, organization computing system 104 may identify at least one ATM to route the user. For example, based on the one or more attributes received from the one or more ATMs, organization computing system 104 may identify a subset of ATMs based on the information identified at operation 310. In some embodiments, organization computing system 104 may identify two or more ATMs that satisfy a criteria specified by the user. In some embodiments, organization computing system 104 may identify a single ATM. In some embodiments, organization computing system 104 may not identify any ATM, because none of the ATMs satisfy the user's criteria (i.e., no ATMs satisfying that criteria were found).

At step 316, organization computing system 104 may transmit the recommendation to client device 102. In some embodiments, organization computing system 104 may notify the user via application 112 executing on client device 102. In some embodiments, organization computing system 104 may notify the user via an electronic message (e.g., text message).

Figure 4:
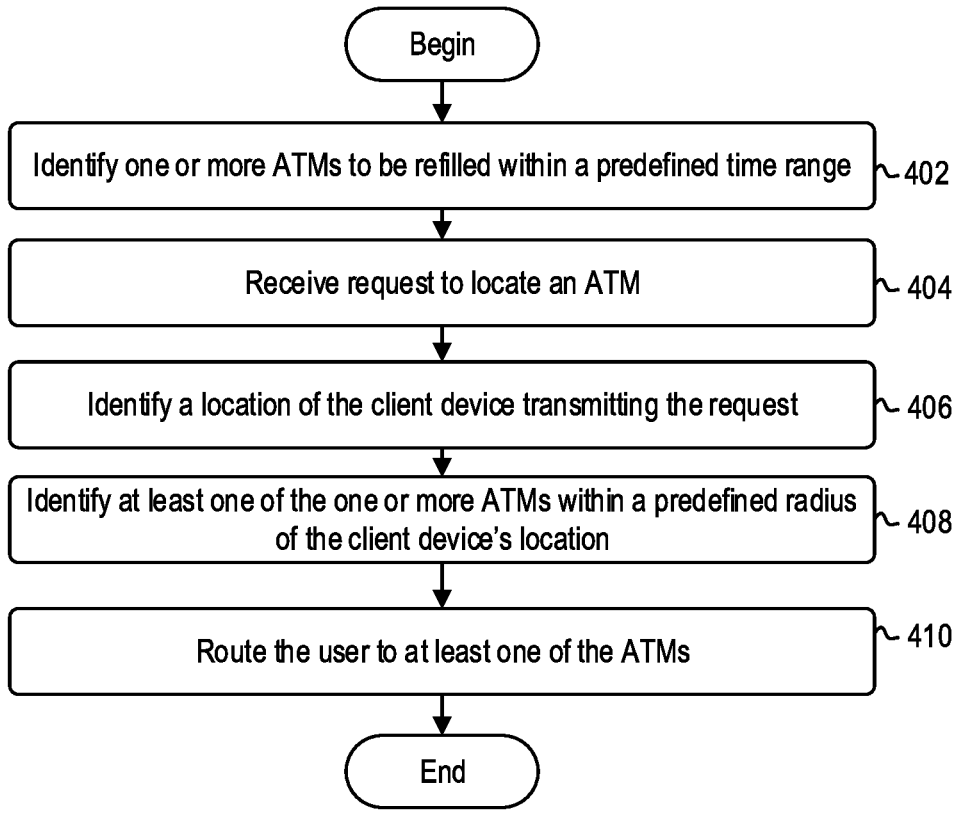
FIG. 4 is a flow diagram illustrating a method of routing customers to an ATM, according to example embodiments.

FIG. 4 is a flow diagram illustrating a method 400 of routing a user to an ATM, according to example embodiments. Method 400 may begin at step 402.

At step 402, organization computing system 104 may identify one or more ATMs to be refilled within a predefined time range. For example, handler 118 may look up what the maintenance schedule is for one or more ATMs. In some embodiments, handler 118 may look up the maintenance schedule via one or more APIs. In some embodiments, handler 118 may look up the maintenance schedule via database 108.

At step 404, organization computing system 104 may receive a request to locate an ATM. In some embodiments, organization computing system 104 may receive a request to locate an ATM via application 112 executing on client device 102. For example, a user may navigate to application 112 executing on client device 102 to locate one or more nearby ATMs. In some embodiments, organization computing system 104 may receive a request to locate an ATM via messaging application 111 executing on client device 102.

At step 406, organization computing system 104 may identify a location of client device 102. In some embodiments, organization computing system 104 may identify the location of client device 102 by interfacing with application 112. For example, a user may have granted application 112 location services, such that application 112 can identify a current location of the user when application 112 is in use. In some embodiments, organization computing system 104 may prompt the user to submit location information via application 112. In some embodiments, organization computing system 104 may prompt the user to submit location information via messaging application 111.

At step 408, organization computing system 104 may identify at least one of the one or more ATMs within a predefined radius of client device 102. For example, organization computing system 104 may identify one or more ATMs 106 that will be refilled soon. In some embodiments, soon may mean the next x-minutes, y-hours, z-days, and the like. Organization computing system 104 may identify those ATMs 106 via the polling operation discussed above in conjunction with step 402.

At step 410, organization computing system 104 may route the user to at least one of the one or more ATMs. For example, based on the refill information received from the one or more ATMs, organization computing system 104 may provide the user with an ATM recommendation. In some embodiments, the ATM recommendation may include two or more ATMs. In some embodiments, the ATM recommendation may include a single ATM recommendation. Organization computing system 104 may transmit the recommendation to client device 102. In some embodiments, organization computing system 104 may notify the user via application 112 executing on client device 102. In some embodiments, organization computing system 104 may notify the user via an electronic message (e.g., text message).

Figure 5:
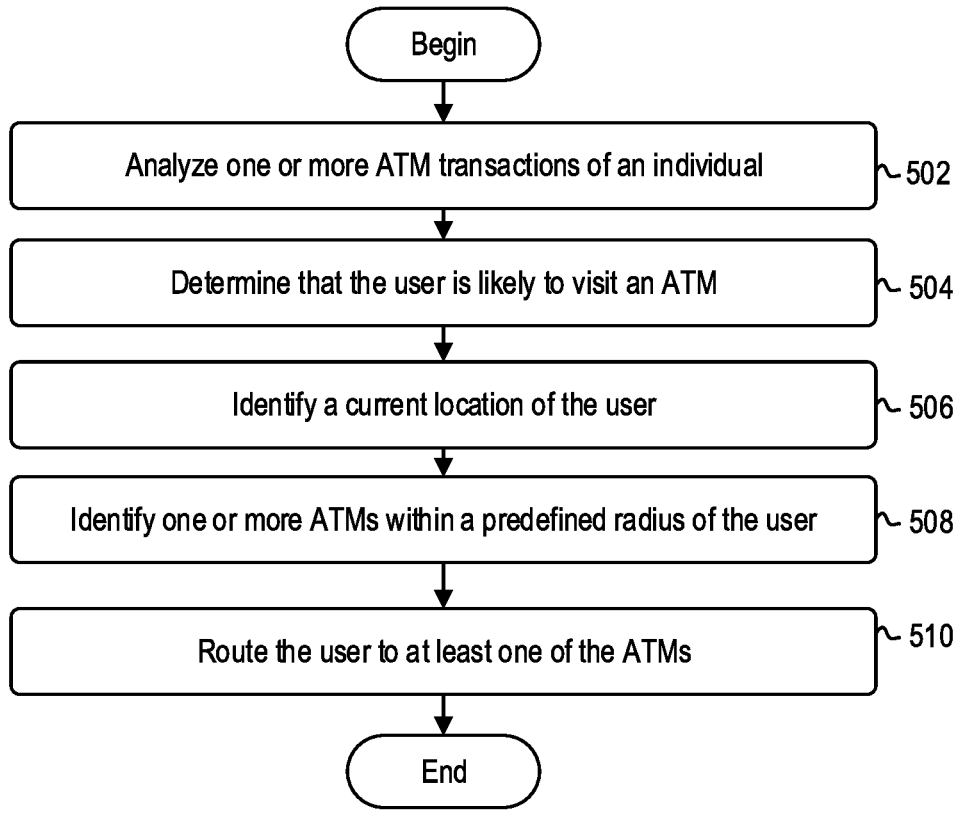
FIG. 5 is a flow diagram illustrating a method of routing customers to an ATM, according to example embodiments.

FIG. 5 is a flow diagram illustrating a method 400 of routing a user to an ATM, according to example embodiments. Method 500 may begin at step 502.

At step 502, organization computing system 104 may analyze one or more ATM transactions of an individual. For example, organization computing system 104 may provide, as input, to machine learning module 116, a stream of transactions 130 associated with a particular user. Machine learning module 116 may leverage a trained prediction model to predict when the user will next transact at an ATM. In other words, organization computing system 104 may leverage a prediction model to forecast the next time a user is expected to withdraw or deposit funds at an ATM.

At step 504, organization computing system 104 may determine that the user is likely to visit an ATM. For example, based on the user's historical transactions 130, machine learning module 116 may generate a date or time at which the user is predicted to utilize an ATM.

At step 506, organization computing system 104 may identify the location of client device 102 by interfacing with application 112. For example, a user may have granted application 112 location services, such that application 112 can identify a current location of the user when application 112 is in use. In some embodiments, organization computing system 104 may prompt the user to submit location information via application 112. In some embodiments, organization computing system 104 may prompt the user to submit location information via messaging application 111.

At step 508, organization computing system 104 may identify at least one ATM 106 within a predefined radius of client device 102. For example, based on the identified location of client device 102, handler 118 may query database 108 to identify one or more ATMs 106 proximate client device 102.

At step 510, organization computing system 104 may route the user to at least one ATM 106. In some embodiments, the ATM recommendation may include two or more ATMs. In some embodiments, the ATM recommendation may include a single ATM recommendation. For example, organization computing system 104 may generate an ATM recommendation by selecting an ATM that has the capabilities for whatever type of interaction machine learning model 116 predicts the customer may have with a given ATM (e.g., withdrawal of bills under $20). Organization computing system 104 may transmit the recommendation to client device 102. In some embodiments, organization computing system 104 may notify the user via application 112 executing on client device 102. In some embodiments, organization computing system 104 may notify the user via an electronic message (e.g., text message).

Figure 6B:
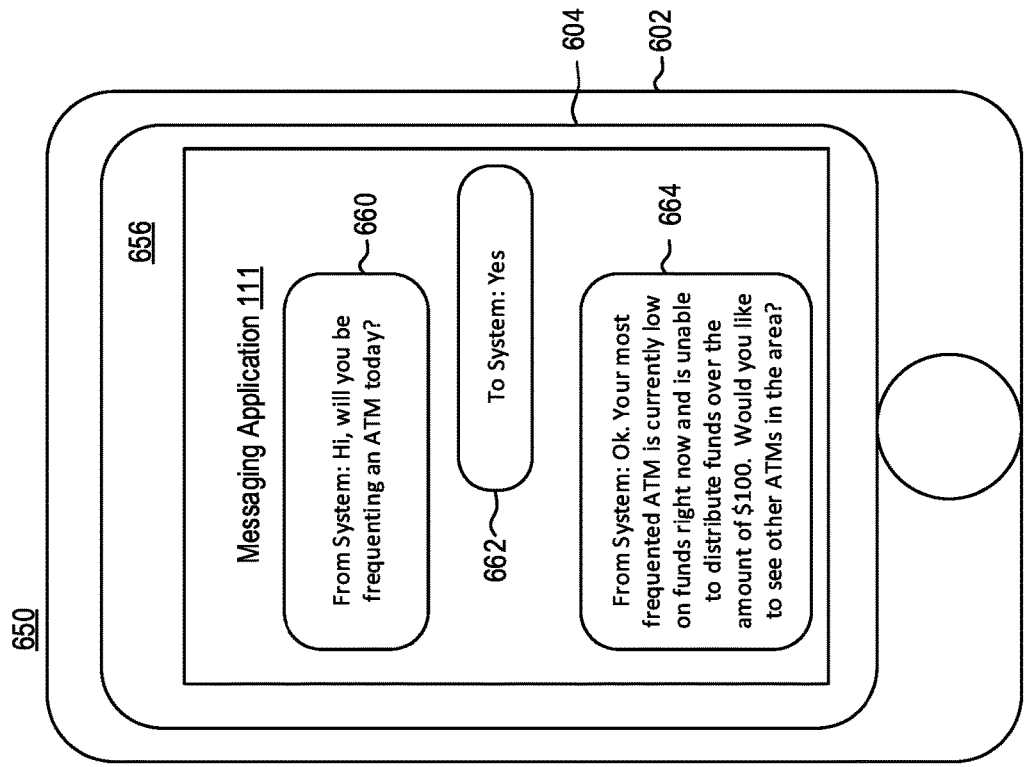
FIG. 6B is a block diagram illustrating an exemplary client device, according to example embodiments.
Figure 6A:
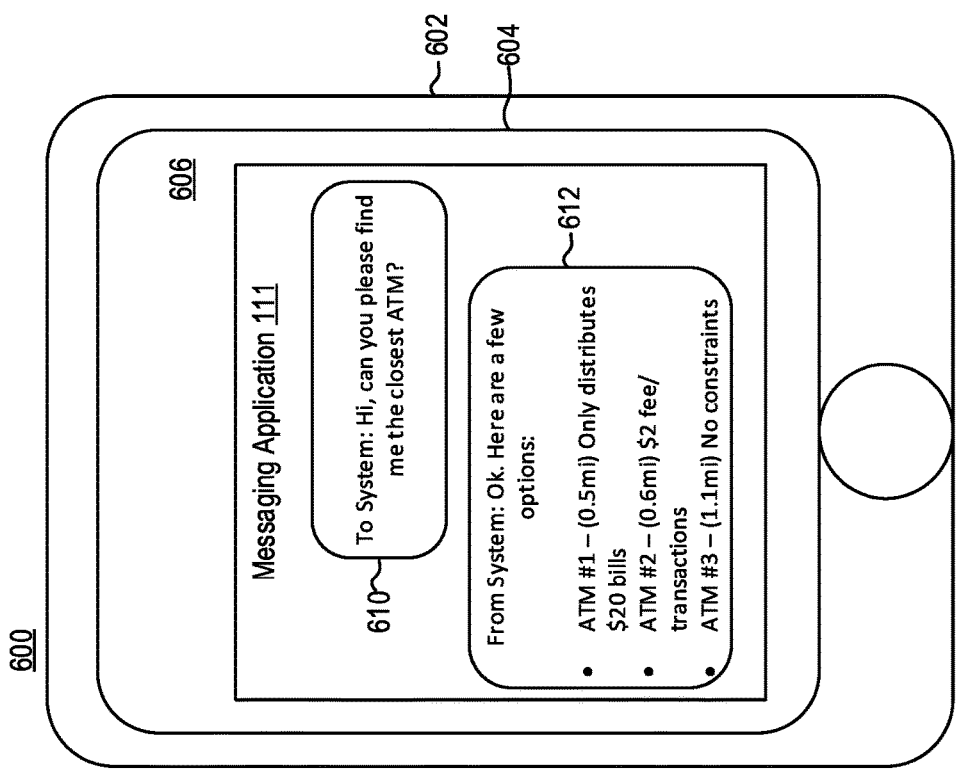
FIG. 6A is a block diagram illustrating an exemplary client device, according to example embodiments.

FIG. 6A is a block diagram 600 illustrating an exemplary client device 602, according to example embodiments. Client device 602 may be similar to client device 102.

As illustrated, client device 602 can include screen 604. Screen 604 may be displaying graphical user interface (GUI) 606. GUI 606 may capture the interaction of client device 602 and organization computing system 104 via messaging application 111.

As illustrated, messaging application 111 may include a first message 610 and a second message 612. First message 610 may be transmitted from client device 602 to organization computing system 104. First message 610 may recite: "Hi, can you please find me the closest ATM'?" In other words, first message 610 may be a request from client device 602 to organization computing system 104 for an ATM location. Upon receiving the request from client device 602, organization computing system, 104 may route the user to at least one ATM 106 via, for example, the operations discussed above in conjunction with FIGS. 2-4.

Second message 612 may include ATM recommendations generated by organization computing system 104. As illustrated, the recommendation includes three ATMs-ATM #1, ATM #2, and ATM #3. Along with each ATM in the recommendation, organization computing system 104 may include information about the ATM. For example, as illustrated, organization computing system 104 may include distance information and attribute information in message 612.

FIG. 6B is a block diagram 650 illustrating an exemplary client device 602, according to example embodiments. Client device 602 may be similar to client device 102.

As illustrated, client device 602 includes screen 604. Screen 604 may be displaying graphical user interface (GUI) 656. GUI 656 may capture the interaction of client device 602 and organization computing system 104 via messaging application 111.

As illustrated, messaging application 111 may include a first message 660, a second message 662, and a third message 664. First message 660 may be transmitted from organization computing system 104 to client device 602. First message 660 may be generated responsive to organization computing system 104 predicting that a user is likely to transact at an ATM in the near future (e.g., the current day, current week, etc.). For example, first message 660 may recite: "Hi, will you be frequenting an ATM today?"

Second message 662 may be transmitted from client device 602 to organization computing system 104. Second message 662 may include a confirmation that the user will be frequenting an ATM today. For example, second message 662 may recite "yes." Upon receiving second message 662, organization computing system 104 may use NLP device 120 to process the message.

Third message 664 may be transmitted from organization computing system 104 to client device 102. Third message 664 may include an ATM recommendation for the user, based, for example, on ATMs frequented by the user. Third message 664 may recite: "Ok. Your most frequented ATM is currently low on funds right now and is unable to distribute funds over the amount of $100. Would you like to see other ATMs in the area?"

Figure 7:
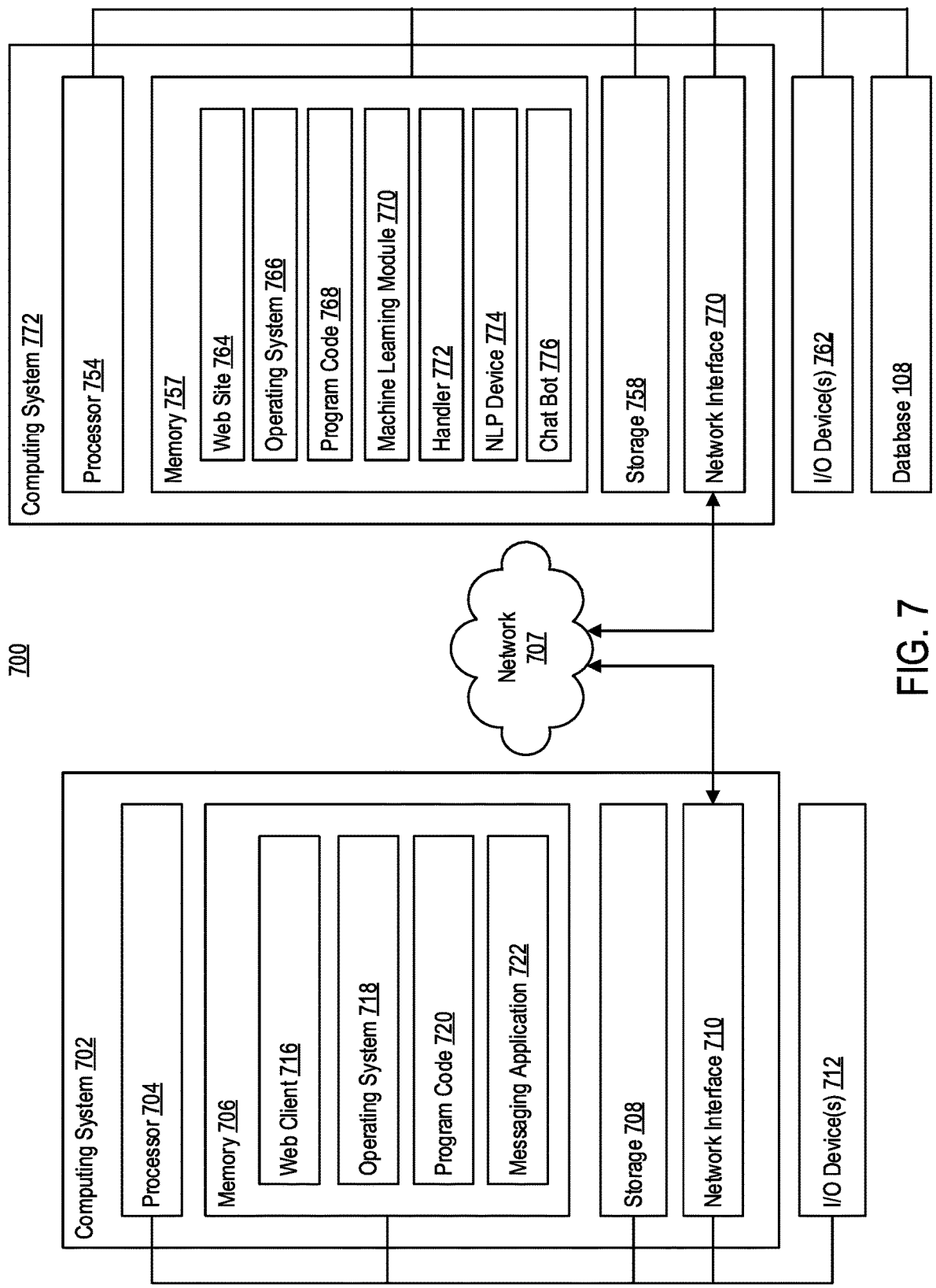
FIG. 7 is a block diagram illustrating a computing environment, according to example embodiments.

FIG. 7 is a block diagram illustrating an exemplary computing environment 700, according to some embodiments. Computing environment 700 includes computing system 702 and computing system 752. Computing system 702 may be representative of client device 102. Computing system 752 may be representative of organization computing system 104.

Computing system 702 may include a processor 704, a memory 706, a storage 708, and a network interface 710. In some embodiments, computing system 702 may be coupled to one or more I/O device(s) 712 (e.g., keyboard, mouse, etc.).

Processor 704 may retrieve and execute program code 720 (i.e., programming instructions) stored in memory 706, as well as stores and retrieves application data. Processor 704 may be included to be representative of a single processor, multiple processors, a single processor having multiple processing cores, and the like. Network interface 710 may be any type of network communications allowing computing system 702 to communicate externally via computing network 705. For example, network interface 710 is configured to enable external communication with computing system 752.

Storage 708 may be, for example, a disk storage device. Although shown as a single unit, storage 708 may be a combination of fixed and/or removable storage devices, such as fixed disk drives, removable memory cards, optical storage, network attached storage (NAS), storage area network (SAN), and the like.

Memory 706 may include application 716, operating system 718, program code 720, and messaging application 724. Program code 720 may be accessed by processor 704 for processing (i.e., executing program instructions). Program code 720 may include, for example, executable instructions for communicating with computing system 752 to display one or more pages of website 764. Application 716 may enable a user of computing system 702 to access a functionality of computing system 752. For example, application 716 may access content managed by computing system 752, such as website 764. The content that is displayed to a user of computing system 702 may be transmitted from computing system 752 to computing system 702, and subsequently processed by application 716 for display through a graphical user interface (GUI) of computing system 702.

Messaging application 722 may be representative of a web browser that allows access to a website or a stand-alone application. In some embodiments, computing system 702 may be configured to execute messaging application 722 to access an email account managed by a third party web server. In some embodiments, computing system 702 may be configured to execute messaging application 722 to transmit one or more text messages (e.g., SMS messages, iMessages, etc.) to one or more remote computing devices.

Computing system 752 may include a processor 754, a memory 756, a storage 758, and a network interface 760. In some embodiments, computing system 752 may be coupled to one or more I/O device(s) 762. In some embodiments, computing system 752 may be in communication with database 108.

Processor 754 may retrieve and execute program code 768 (i.e., programming instructions) stored in memory 756, as well as stores and retrieves application data. Processor 754 is included to be representative of a single processor, multiple processors, a single processor having multiple processing cores, and the like. Network interface 760 may be any type of network communications enabling computing system 752 to communicate externally via computing network 705. For example, network interface 760 allows computing system 752 to communicate with computer system 702.

Storage 758 may be, for example, a disk storage device. Although shown as a single unit, storage 758 may be a combination of fixed and/or removable storage devices, such as fixed disk drives, removable memory cards, optical storage, network attached storage (NAS), storage area network (SAN), and the like.

Memory 756 may include website 764, operating system 766, program code 768, machine learning module 770, handler 772, NLP device 774, and chat boy 776. Program code 768 may be accessed by processor 754 for processing (i.e., executing program instructions). Program code 768 may include, for example, executable instructions configured to perform steps discussed above in conjunction with FIGS. 2-5. As an example, processor 754 may access program code 768 to perform operations related to routing a user to an ATM. In another example, processor 754 may access program code 768 to facilitate an ATM recommendation. Website 764 may be accessed by computing system 702. For example, website 764 may include content accessed by computing system 702 via a web browser or application.

Machine learning module 770 may be configured to learn user ATM habits. For example, machine learning module 770 may be configured to learn how often a user transacts at an ATM, the ATMs at which the user transacts, the types of ATMs with which the user interacts, user transaction habits at ATMs, and the like. Machine learning module 770 may include one or more instructions to train a prediction model. To train the prediction model, machine learning module 770 may receive, as input, ATM transaction data. Such ATM transaction data may include a plurality of ATM transactions, the users associated with each transaction, one or more attributes of the ATM involved in each transaction, and the like. Machine learning module 770 may implement one or more machine learning algorithms to train the prediction model to identify an ATM to which computing system 772 may route the user. For example, machine learning module 770 may train a prediction model to identify one or more features ATM habits of an individual and one or more attributes of each ATM visited by the user to identify user preferences on ATM use. In some embodiments, the prediction model may generate a plurality of ATM options, allowing the user to choose the ATM at which the user wishes to transact. Still further, in some embodiments, the prediction model may generate a prediction of when the user will next transact at an ATM and generate a proposal for the user in anticipation of this next transaction.

Machine learning module 770 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule-based machine learning model, and the like to train the prediction model.

Chat bot 776 may be configured to communicate with computing system 702. For example, chat bot 776 may be configured to receive one or more messages from computing system 702. In some embodiments, chat bot 776 may be configured to establish a persistent chat session between computing system 702 and computing system 704. Additionally, chat bot 776 may engage in dialogue with a user of computing system 702, such that chat interface 776 may respond to any follow-up questions the user may have. For example, chat bot 776 may provide the user with one or more ATM recommendations, based on an output generated by the prediction model.

NLP device 776 may be configured to receive and process incoming dialogue messages from computing system 702. For example, NLP device 776 may be configured to receive a request from computing system 702 for locating a nearby ATM based on user preferences. NLP device 776 may be configured to receive and execute a command that includes the request, where the command instructs NLP device 776 to work in conjunction with machine learning module 770 to route the user to a particular ATM. NLP device 776 may be configured to continuously monitor or intermittently listen for and receive commands to determine if there are any new commands or requests directed to NLP device 776. Upon receiving and processing an incoming dialogue message, NLP device 776 may output the meaning of the request, for example, in a format that other components of computing system 704 can process. In some embodiments, the received dialogue message may be the result of computing system 702 transmitting a text message to computing system 704. In some embodiments, the received dialogue message may be the result of computing system 702 transmitting an electronic message to computing system 704.

Handler 772 may be configured to manage an account associated with each user. For example, account handler 772 may be configured to communicate with database 108.

While the preceding is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readable by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of routing customers to an automated teller machine (ATM), comprising:

retrieving, by a computing system associated with at least one financial institution having an ATM network, historical ATM transaction data for a plurality of users of the ATM network, wherein the historical ATM transaction data comprises, for each individual user, a user identifier and attributes of a respective ATM associated with each historical ATM transaction executed by that user;

training, by the computing system using a machine learning module of the computing system, a plurality of prediction models, to learn individualized user ATM habits based on training sets comprising the historical ATM transaction data for each user;

storing in a database associated with the computing system, for each user, the user identifier, the historical ATM transaction data for the user and a respective prediction model for predicting the individualized ATM habits of the user and the attributes of the ATMs the user frequents, wherein the user's ATMs comprise ATMs associated with the financial institution and third party ATMs;

receiving, by the computing system from a client device associated with a user, a request to locate a target ATM, wherein the request comprises a constraint of a desired ATM, wherein the computing system is in electronic communication with an application installed on the client device for providing location services and electronic dialog messaging services to the computing system, wherein the request is generated by the user using an interface generated on the client device by the application;

determining, by the computing system and based on the request, the user identifier associated with the user and a location of the client device;

accessing, from the database and based on the determined user identifier, the prediction model associated with the user;

identifying, by the computing system, a plurality of ATMs proximate the location of the client device based on the constraint, wherein the plurality of identified ATMs are selected from a group comprising financial institution ATMs and third party ATMs;

generating, by the computing system via the user's individual prediction model, a personalized ATM recommendation for the user by:
 prompting, via the interface on the client device, the user to enter parameters associated with the user's desired transaction;
 identifying, by the computing system, based on the user's entered parameters, current attributes associated with each respective ATM of the plurality of ATMs proximate to the location of the client device, wherein the computing system, in response to the request, communicates with each respective ATM to identify current attributes; and
 comparing, by the computing system, the attributes from each respective ATM of the plurality of ATMs to historical ATM usage statistics of the user; and interfacing, with the user, via a dialog message session generated on the interface of the client device and via a chat bot generated by the application, to route the user of the client device to the target ATM from the plurality of ATMs based at least partially on the historical ATM usage statistics.

2. The method of claim 1, wherein receiving, by the computing system from the client device, the request to locate the target ATM comprises:
 receiving, by the computing system, a text message from the client device; and
 analyzing, by the computing system, the text message to identify the request contained therein.

3. The method of claim 1, wherein the constraint of the desired ATM comprises at least one or more of a maximum distance of the ATM from the location of the client device, a type of ATM, a fee-free ATM, an in-store ATM, and a no-limit ATM.

4. The method of claim 1, wherein identifying, by the computing system, the attributes associated with each respective ATM of the plurality of ATMs proximate the location of the client device comprises:
 receiving, from each ATM, a total amount of funds available in the ATM.

5. The method of claim 1, wherein the attributes associated with the ATMs comprise at least one or more of a fee associated with withdrawal, an increment in which funds are withdrawn, and a location of the ATM.

6. The method of claim 1, routing, by the computing system, the user of the client device to the target ATM from the plurality of ATMs based at least partially on the historical ATM usage statistics, comprises:

routing the user to the target ATM, wherein the target ATM is scheduled to be refilled within a predefined period of the request.

7. A system associated with at least one financial institution having an ATM network, comprising:
 a processor; and
 a memory having programming instructions stored thereon, which, when executed by the processor, perform one or more operations comprising:
  retrieving historical ATM transaction data for a plurality of users of the ATM network, wherein the historical ATM transaction data comprises, for each individual user, a user identifier and attributes of a respective ATM associated with each historical ATM transaction executed by that user;
  training, using a machine learning module, a plurality of prediction models, to learn individualized user ATM habits based on training sets comprising the historical ATM transaction data for each user;
  storing in a database, for each user, the user identifier, the historical ATM transactions for the user and the prediction model for predicting the individualized ATM habits of the user and the attributes of the ATMs the user frequents, wherein the user's ATMs comprise ATMs associated with the financial institution and third party ATMs;
  receiving, from a client device associated with a user, a request to locate a target ATM, wherein the request comprises a constraint of the ATM, wherein the system is in electronic communication with an application installed on the client device for providing location services and electronic dialog messaging services to the system, wherein the request is generated by the user using an interface generated on the client device by the application;
  determining, based on the request, the user identifier associated with the user and the location of the client device;
  accessing, from the database and based on the determined user identifier, the prediction model associated with the user;
  identifying a plurality of ATMs proximate the location of the client device based on the constraint, wherein the plurality of identified ATMs are selected from a group comprising financial institution ATMs and third party ATMs;
  generating, via the user's individual prediction model, a personalized ATM recommendation for the user by:
   prompting, via the interface on the client device, the user to enter parameters associated with the user's desired transaction;
   identifying, based on the user's entered parameters, current attributes associated with each respective ATM of a plurality of ATMs proximate the location of the client device based on the constraint, wherein the system, in response to the request, communicates with each respective ATM to identify current attributes; and
   comparing the attributes from each respective ATM to historical ATM usage statistics of the user; and
  interfacing, with the client device via a chat bot, to route the user to a target ATM from the plurality of ATMs based at least partially on the historical ATM usage statistics.

8. The system of claim 7, wherein receiving, from the client device, the request to locate the ATM comprises:

receiving an electronic message from the client device; and analyzing the electronic message to identify the request contained therein.

9. The system of claim 7, wherein the constraint of the target ATM comprises at least one or more of a maximum distance of the ATM from the location of the client device, a type of ATM, a fee-free ATM, an in-store ATM, and a no-limit ATM.

10. The system of claim 7, wherein identifying the attributes associated with each respective ATM of the plurality of ATMs proximate the location of the client device identifying, for each ATM, a total amount of funds available in the ATM.

11. The system of claim 7, wherein the attributes associated with each ATM of the plurality of ATMs comprise at least one or more of a fee associated with withdrawal, an increment in which funds are withdrawn, and a location of the ATM.

12. A non-transitory computer readable medium comprising one or more sequences of instructions which, when executed by one or more processors, causes a computing system to perform operations, comprising:

retrieving, by the computing system associated with at least one financial institution having an ATM network, historical ATM transaction data for a plurality of users of the ATM network, wherein the historical ATM transaction data comprises, for each individual user, a user identifier and attributes of a respective ATM associated with each historical ATM transaction executed by that user;

training, by the computing system using a machine learning module of the computing system, a plurality of prediction models, to learn individualized user ATM habits based on training sets comprising the historical ATM transaction data for each user;

storing in a database associated with the computing system, for each user, the user identifier, the historical ATM transactions for the user and the prediction model for predicting the individualized ATM habits of the user and the attributes of the ATMs the user frequents, wherein the user's ATMs comprise ATMs associated with the financial institution and third party ATMs;

receiving, by the computing system from a client device associated with a user, a request to locate a target ATM, wherein the request comprises a constraint of a desired ATM, wherein the computing system is in electronic communication with an application installed on the client device for providing location services and electronic dialog messaging services to the computing system, wherein the request is generated by the user using an interface generated on the client device by the application;

determining, by the computing system and based on the request, the user identifier associated with the user and the location of the client device;

accessing, from the database and based on the determined user identifier, the prediction model associated with the user;

identifying, by the computing system, a plurality of ATMs proximate the location of the client device based on the constraint, wherein the plurality of identified ATMs are selected from a group comprising financial institution ATMs and third party ATMs;

generating, by the computing system via the user's individual prediction model, a personalized ATM recommendation for the user by:

prompting, via the interface on the client device, the user to enter parameters associated with the user's desired transaction;

identifying, by the computing system, based on the user's entered parameters, current attributes associated with each respective ATM of the plurality of ATMs proximate to the location of the client device, wherein the computing system, in response to the request, communicates with each respective ATM to identify current attributes; and comparing, by the computing system, the attributes from each respective ATM of the plurality of ATMs to historical ATM usage statistics of the user; and interfacing, with the user, via a dialog message session generated on the interface of the client device and via a chat bot generated by the application, to route the user of the client device to the target ATM from the plurality of ATMs based at least partially on the historical ATM usage statistics.

13. The non-transitory computer readable medium of claim 12, wherein receiving, by the computing system from the client device, the request to locate the target ATM comprises:

receiving, by the computing system, a text message from the client device; and analyzing, by the computing system, the text message to identify the request contained therein.

14. The non-transitory computer readable medium of claim 12, wherein the constraint of the desired ATM comprises at least one or more of a maximum distance of the ATM from the location of the client device, a type of ATM, a fee-free ATM, an in-store ATM, and a no-limit ATM.

15. The non-transitory computer readable medium of claim 12, wherein identifying, by the computing system, the attributes associated with each respective ATM of the plurality of ATMs proximate the location of the client device comprises:

receiving, from each ATM, a total amount of funds available in the ATM.

16. The non-transitory computer readable medium of claim 12, wherein the attributes associated with the ATMs comprise at least one or more of a fee associated with withdrawal, an increment in which funds are withdrawn, and a location of the ATM.

17. The non-transitory computer readable medium of claim 12, routing, by the computing system, the user of the client device to the target ATM from the plurality of ATMs based at least partially on the historical ATM usage statistics, comprises:

routing the user to the target ATM, wherein the target ATM is scheduled to be refilled within a predefined period of the request.

* * * * *